United States Patent [19]

Rypkema

[11] 4,118,740
[45] Oct. 3, 1978

[54] SURFACE WAVE AFC DISCRIMINATOR WITH TWO ZERO CROSSINGS

[75] Inventor: Jouke N. Rypkema, Lombard, Ill.

[73] Assignee: Zenith Radio Corporation, Glenview, Ill.

[21] Appl. No.: 817,653

[22] Filed: Jul. 21, 1977

[51] Int. Cl.² ............................................. H04N 5/50
[52] U.S. Cl. .................................................. 358/195
[58] Field of Search ............... 358/195, 191, 192, 193; 331/20; 325/419, 420, 423

[56] References Cited

U.S. PATENT DOCUMENTS

| 3,459,887 | 8/1969 | Baker | 358/195 |
|---|---|---|---|
| 3,968,325 | 7/1976 | Beriere | 358/195 |

Primary Examiner—John C. Martin
Attorney, Agent, or Firm—Nicholas A. Camasto

[57] ABSTRACT

A television tuning system has a voltage controlled oscillator and frequency converter, cooperating to convert a receiver broadcast signal to an intermediate frequency signal and an intermediate frequency filter having a predetermined frequency response. Automatic frequency control means operative upon the voltage controlled oscillator to maintain correct frequency conversion include a limiter coupled to the intermediate frequency filter producing a constant amplitude output signal which is coupled directly to one input of a multiplier and to a surface acoustic wave filter having a predetermined frequency-dependent phase shift characteristic. The filter characteristic defines quadrature phase points at the picture carrier frequency and a selected frequency substantially midway between the picture and sound carriers. The filter output is coupled to the remaining multiplier input. A low pass filter couples the output signal of the multiplier to the voltage controlled oscillator thereby providing automatic frequency control. The output voltage characteristic of the multiplier includes zero crossings at the intermediate frequency picture carrier frequency and at a frequency between the intermediate frequency picture and sound carriers.

7 Claims, 5 Drawing Figures

SURFACE WAVE AFC DISCRIMINATOR WITH TWO ZERO CROSSINGS

BACKGROUND OF THE INVENTION

This invention is related to copending application Ser. No. 791,894 by Michael E. Long which is assigned to the assignee of the present invention.

This invention relates generally to television AFC systems. The television broadcast signal comprises a carrier upon which luminance, chrominance and sound information is modulated within a limited bandwidth. The sound information is present as a frequency-modulated subcarrier displaced from the picture carrier. In the NTSC signal transmission used in the U.S. of America, the sound and picture carriers are frequency-spaced 4.5MHz while the channel bandwidth is 6MHz. In order to fit the frequency-spaced sound and picture carriers and other information within the prescribed bandwidth, vestigial transmission in which part of one sideband (in this case the lower sideband) is substantially attenuated with respect to the other sideband (upper sideband) is used. The range of broadcast frequencies assigned to television transmission is not continuous but rather forms an interrupted group of bands. However, despite this discontinuity, all assigned channels may have at least one adjacent channel, and often two adjacent channels may "flank" each channel. This means that the majority of channels may have adjacent sound carrier signals 6MHz above and below their desired or associated channel sound carrier and adjacent picture carriers 6MHz above and below their associated channel picture carrier. This condition often exists on cable distribution systems.

The vast majority, if not all, of currently manufactured television receivers include a tuning system which selects a desired channel by frequency converting the received broadcast signal, using the well-known heterodyning process, to a common intermeidate frequency (IF) signal having frequency-spaced picture and sound carriers. Unfortunately, the heterodyning process also frequency converts the adjacent channel carriers to "intermediate frequency" signals. As a result, most receivers use frequency selective intermediate frequency filters which pass the desired intermediate frequency signal but include trap networks which exclude or attenuate undesired adjacent channel information.

For example, in the system of assigned frequencies within the U.S. a standard IF frequency of 45.75MHz for the picture carrier has been generally established. Correspondingly, the associated sound carrier is 4.5MHz lower in frequency at 41.25MHz. In the portions of the television band in which adjacent channels are present, the IF sound carrier of the lower adjacent channel is 47.25MHz ( only 1.5MHz away from the desired channel picture carrier) while the picture carrier of the upper adjacent channel is 39.75MHz (only 1.5MHz away from the desired channel sound carrier). This situation has lead practitioners in the television art to flank the IF passband with trap networks to attenuate the adjacent signal carriers. Unfortunately, these traps also upset associated channel carrier relationships during mistuning.

These and other stringent tuning requirements have lead to the use of automatic frequency control systems (AFC) to maintain correct frequency conversion within the tuning system. Such AFC systems are well-known in the art and are of almost endless variety but all may be characterized by the performance of two essential functions. The first function is generally called "pull-in" or "frequency acquisition" in which an existing frequency deviation of the picture IF carrier from the desired 45.75MHz is corrected by the closed-loop response of the AFC system. The second function is generally called "hole-in" which involves the maintenance of correct frequency conversion once frequency acquisition has been accomplished. A basic limitation in the ability of most AFC systems to acquire correct tuning in the face of a substantial frequency deviation arises from the presence of the adjacent channel picture and sound carrier traps mentioned above. For example, should the oscillator frequency be displaced such that the frequency conversion results in "placing" the video carrier within the adjacent channel sound trap, virtually no error signal, or control effect, is produced within the AFC system due to the picture carrier. However, the sound carrier under such conditions is "exalted" by the IF filter response and produces substantial energy within the AFC system often resulting in an erroneous control voltage.

In most AFC systems, dominance by the sound carrier rather than the picture carrier, causes the system to lose its pull-in capability and "lock-out" of the system occurs. The relative signal strengths of picture and sound carriers is determined by the IF filter response, and under proper transmission conditions and near correct tuning the effect of the picture carrier will dominate the AFC system. However, transmission problems such as multi-path interference or "tilt" within the antenna and distribution system can disturb this amplitude relationship resulting in the production of an overriding sound carrier control effect which again can cause a lock-out condition.

The problem of AFC lock-out caused by the intrusion of the picture carrier into the adjacent channel sound trap has been minimized by development of AFC systems in which the sound carrier produces a control effect of the proper polarity to aid or complement that produced by the picture carrier and actually control the AFC system when the picture carrier is substantially attenuated. One such system shown in U.S. Pat. No. 3,459,887 uses an automatic frequency control system in which the balance of a diode-pair AFC detector is offset, or biased, to produce the desired complementary control effect by the sound carrier. The described system achieves substantial improvement in AFC pull-in when the picture carrier is attenuated by the adjacent channel sound trap. A somewhat similar system is shown in U.S. Pat. No. 3,968,325 in which a product detector, or multiplier, simultaneously driven by a pair of IF signals emmanating from the intermediate frequency filter performs the AFC detection function. A frequency-dependent phase shift between the two IF signals is introduced such that the frequency deviation of the intermediate frequency signal is converted to a phase deviation to which the product detector responds. The AFC response provides a reduction of the erroneous AFC voltage produced by detected noise in the region of the received channel sound carrier and a complementary sound carrier control effect similar to that of the U.S. Pat. No. 3,459,887. The creation of a complementary sound carrier control effect in both systems provides improved pull-in or acquisition when the frequency deviation is such that the picture and sound carriers are above the correct frequencies. However, such systems do not produce complementary control effects when the frequency deviation is low.

The above-noted related application sets forth a novel AFC system in which an improved complementary control effect even at small frequency deviations as well as the avoidance of a frequency off-set is provided. The described system in its preferred form utilizes an additional resonant network in the frequency-dependent phase shift network to provide an AFC characteristic having zero crossing at the intermediate frequency sound carrier.

In addition, a number of phase shift type frequency discriminators have been developed in the art. Representative of which are U.S. Pat. Nos. 3,582,540 and 3,714,594 both assigned to the assignee of the present invention.

OBJECT OF THE INVENTION

It is an object of the present invention to provide an improved AFC system which produces a complementary sound carrier control effect.

SUMMARY OF THE INVENTION

In a television tuning system having a voltage controlled oscillator producing a heterodyning signal, a frequency converter translating a received broadcast signal to an intermediate frequency signal, an intermediate frequency filter, automatic frequency control means produce a first control effect due to the intermediate frequency picture carrier and a second control effect due to the intermediate frequency sound carrier. The automatic frequency control means comprise a surface acoustic wave filter having a frequency-dependent phase characteristic such that a quadrature phase shift is imposed upon signals at the intermediate frequency picture carrier frequency and signals of a predetermined frequency substantially midway between said intermediate frequency picture and sound carriers, and multiplier means having first and second input channels, producing an error signal having a zero value when the input signals are in quadrature and opposite polarity maxima when the input signals are in-phase and counter-phase. The first multiplier input channel is coupled via the surface acoustic wave filter while the second is coupled directly. The output of the multiplier forms an error signal which is coupled to the voltage controlled oscillator.

BRIEF DESCRIPTION OF THE DRAWINGS

The features of the present invention which are believed to be novel are set forth will particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
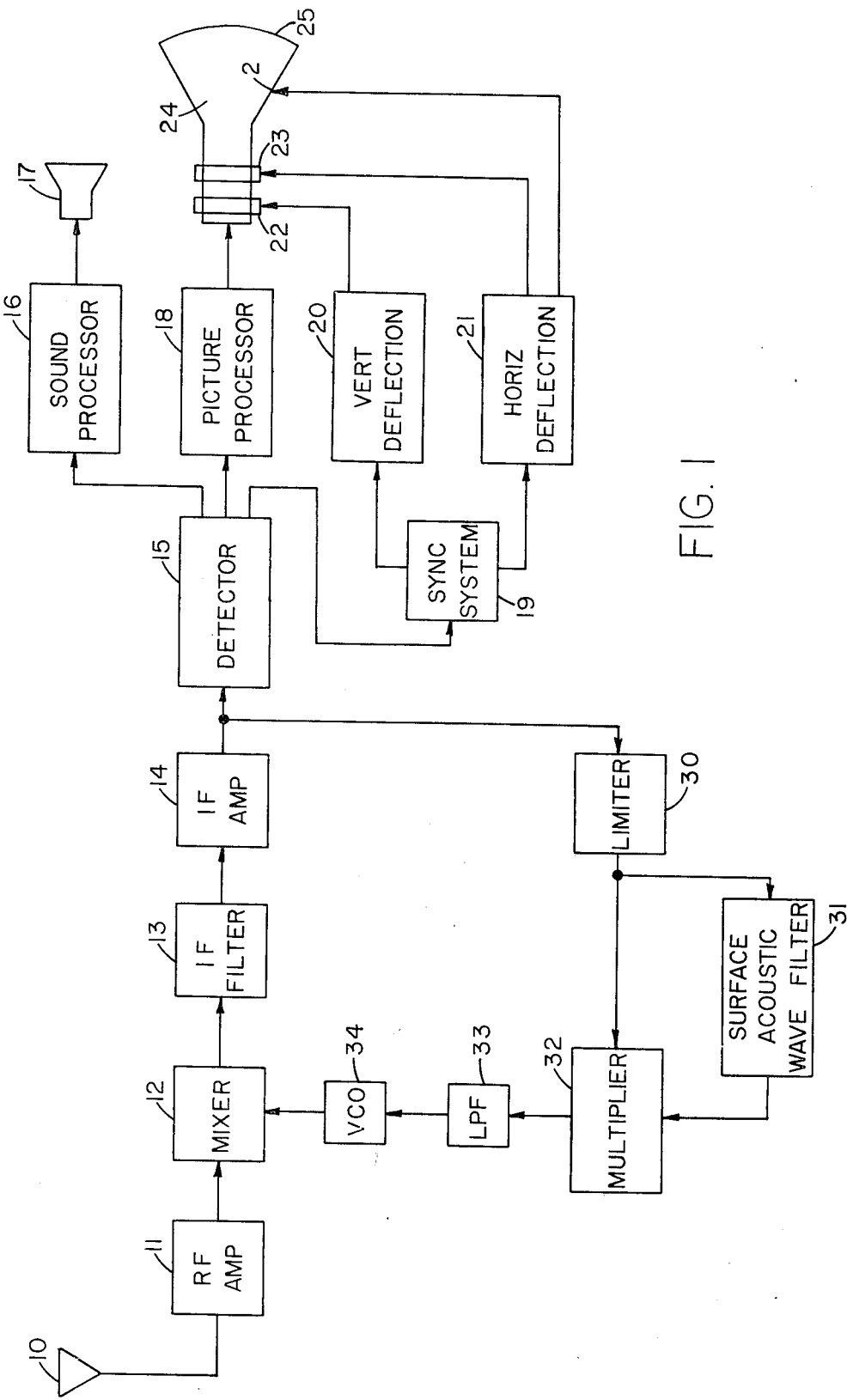
FIG. 1 is a television receiver constructed in accordance with the present invention.

FIG. 1 shows a television receiver constructed in accordance with the present invention in which a receiving antenna 10 is coupled to an RF amplifier 11, the output of which is coupled to a mixer 12. The output of mixer 12 is coupled via an IF filter 13 to an IF amplifier 14. The output of IF amplifier 14 is coupled to a detector 15 and a limiter 30. Detector 15 has three outputs coupled to a sound processor 16, a picture processor 18 and a sync system 19. Sound processor 16 is coupled to a speaker 17 while picture processor 18 is coupled to the intensity control electrodes (not shown) within a CRT 24. Sync system 19 has two outputs, the first of which is coupled to a vertical deflection system 20, while the other is coupled to a horizontal deflection system 21. The output of vertical system 20 is coupled to a vertical deflection yoke 22 which is supported by CRT 24. Horizontal deflection system 21 is coupled to a horizontal deflection yoke 23 also supported by CRT 24 and to an accelerating electrode 26 of CRT 24. The output of limiter 30 is coupled directly to one input of a multiplier 32 and to the remaining input of multiplier 32 via a surface acoustic wave filter 31. The output of multiplier 32 is coupled to a voltage controlled oscillator 34 via a low pass filter 33 while voltage controlled oscillator 34 is coupled to mixer 12.

In operation, a television broadcast signal received by antenna 10 is amplified by RF amplifier 11 to a power level sufficient to drive mixer 12, which by the familiar heterodyning process responds to the output signal of VCO 34 and the broadcast signal to convert the latter to an intermediate frequency signal. IF filter 13 provides a frequency selective coupling for the intermediate frequency signal. The signal is then further amplified by IF amplifier 14 to a power level sufficient to drive detector 15. The latter may include circuitry constructed in accordance with any one of the several well-known designs of television detectors for recovering the modulated information components of sound, luminance and chrominance, and deflection synchronization signals. Sound processor 16 includes conventional frequency modulation detection circuitry which recovers the audio information and amplifies it to a power level sufficient to drive speaker 17. Picture processor 18 includes television processing circuitry which produces the appropriate color-video intensity-control signals used to modulate the electron beams sources (not shown) within CRT 24 directed at the light emitting phosphor targets (also not shown) of viewing screen 25. Sync system 19 includes circuitry separating the synchronization signals from the remainder of the modulation components. The output of sync system 19 forms a succession of horizontal and vertical scansion frequency pulses which is used to synchronize the two-direction scansion of CRT viewing screen 25. In addition, horizontal deflection system 21 also produces an appropriate "high voltage" electron accelerating potential for CRT 24. The receiver portions described thus far may be of conventional design operating in accordance with well-known television principles.

Figure 2A:
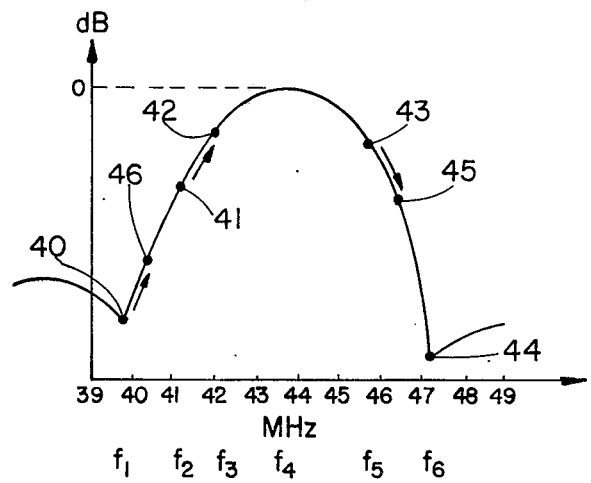
FIG. 2A is a frequency response graph of a typical television receiver IF filter.

In addition, an understanding of the advantages of the present invention automatic frequency control system is best obtained if other television receiver principles are discussed prior to a detailed description of the inventive system. FIG. 2A shows the frequency response of IF filter 13 for a typical NTSC color television receiver in which frequency $f_1$ (39.75MHz) corresponds to the picture carrier of the adjacent channel while frequency $f_2$ (41.25MHz) corresponds to the frequency of the associated channel sound carrier. Frequency $f_5$ (45.75MHz) corresponds to the associated channel picture carrier and frequency $f_6$ (47.25MHz) corresponds to the frequency of the adjacent channel sound carrier. The IF filter response shown is typical in that a broad passband is flanked by trap responses which appear as "valley" portions at the frequencies of the adjacent channel picture carrier $f_1$ and the adjacent channel sound carrier $f_6$. The relative amplitudes of signals after filtering by IF filter 13 are readily ascertained by noting the intercept of a vertical line extended upward from the frequency axis with the response curve. For example, the relative amplitudes of the associated channel sound and picture carriers are found by comparison of intercepts 41 and 43 corresponding to frequencies $f_2$ and $f_5$ respectively. The condition shown is one of "correct" tuning, that is, the frequency of VCO 34 is correct for the desired channel causing the frequency conversion of mixer 12 to produce an intermediate frequency signal in which the associated channel picture and sound carriers (intercepts 43 and 41 respectively) are approximately equal and the adjacent channel carriers ($f_1$ and $f_6$) are within their respective traps. In the event of incorrect frequency conversion, the associated and adjacent channel signals have incorrect frequencies which are graphically depicted by visualizing a lateral movement of all signals along the frequency axis.

For example, should the erroneous frequency conversion produce a high side error, the response of the associated sound carrier $f_2$ would move from its position at intercept 41 to intercept 42 causing an increase of associated sound carrier signal. Correspondingly, the associated picture carrier would move from intercept 43 to intercept 45 causing a reduction of associated picture carrier signal. In the presence of such error, it should be noted that the sound carrier is now actually of greater amplitude than the picture carrier. In addition, the adjacent channel picture carrier has "moved" from its normal amplitude within its trap (intercept 40) to an increased amplitude (intercept 46). The result of such disturbance of signal amplitude relationships upon the automatic frequency control system is complex. However, suffice it to say here that the AFC detector will, when driven by this combination of signals, produce a plurality of "control effects" which are a function of the relative carrier levels presented to the limiter and multiplier. In accordance with an important aspect of the present invention surface acoustic wave filter 31 (by an operation described below) causes the control effects for associated picture and sound carriers to be complementary in similar manner to those achieved in the above-described complementary systems. In addition however, the use of a surface acoustic wave filter for frequency-dependent phase shift having a plurality of quadrature phase frequencies provides even greater system attractiveness which will be described below.

Figure 2B:
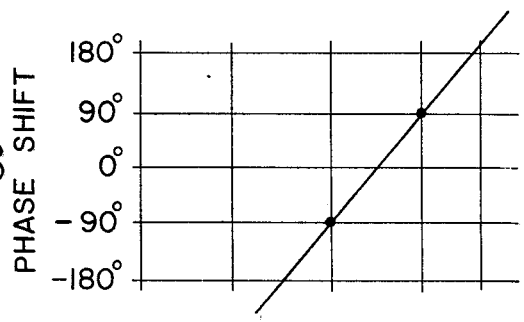
FIG. 2B is a phase versus frequency plot of the phase shift network used in the present invention AFC system.

Turning now to the operation of the present invention automatic frequency control system, limiter 30 removes the amplitude variations present in the output signal of IF amplifier 14 and produces a substantially constant amplitude output signal which otherwise corresponds in frequency and phase to the intermediate frequency signal. The constant amplitude output signal of limiter 30 is applied to acoustic wave filter 31 which imparts a frequency-dependent phase and amplitude characteristic to the signal before application to one input of multiplier 32. FIG. 2B shows the frequency-dependent phase shift characteristic of filter 31. As can be seen, the curve is substantially linear for the band of frequencies of interest and provides leading and lagging quadrature phase shifts for signals at frequencies $f_5$ and $f_4$, respectively. It will be apparent to those skilled in the art that a "curvilinear" characteristic may also be used without departing from the spirit of the present invention. Also a zero phase shift is imparted to signals midway between $f_4$ and $f_5$ while 180° phase shifts are imparted to signals at frequencies above and below the quadrature phase frequencies. In addition, the output of limiter 30 is coupled directly to multiplier 32 substantially without any frequency-dependent phase shift.

The frequency-dependent phase shift imparted by acoustic wave filter 31 to one multiplier input and direct coupling of the other, cause the relative phase between multiplier input signals to vary as a function of signal frequency. Multiplier 32 includes product detection circuitry for which an output signal indicative of the phase relationship between respective input signals is produced which is zero for all conditions of quadrature phase between input signals (i.e., both leading and lagging 90° relative phases). Input signals which are either in-phase and counter-phase (0° and 180° relative phases respectively) each produce output voltage maxima. However, in-phase input signals produce maxima of opposite polarity to those of counter-phase input signals. As a result, the "phase detection" of multiplier 32 in cooperation with acoustic wave filter 31, and IF filter 13 actually produces a frequency control error signal. The error signal is coupled via low pass filter 33, which determines the loop time constant, to VCO 34 in a negative feedback manner controlling VCO frequency and accomplishing automatic frequency control.

Figure 2C:
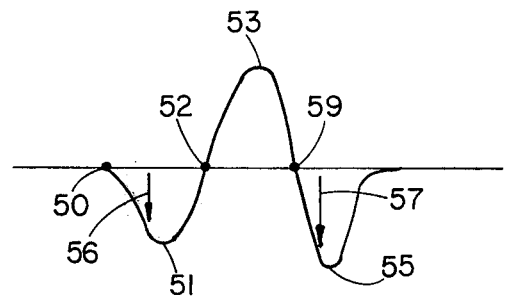
FIG. 2C is a graph of the frequency discrimination characteristic of the present invention AFC system.

FIG. 2C shows the swept frequency response AFC characteristic, produced by the actions of limiter 30, surface acoustic wave filter 31 and multiplier 32. Of particular importance to the present invention are the zero crossing intercepts 50, 52 and 54 which as mentioned correspond respectively to the frequencies of the associated sound carrier $f_2$, a frequency midway between the sound and picture carriers $f_4$ and the associated picture carrier $f_5$. Again, the condition shown by intercepts 50, 52 and 54 in FIG. 2C is that of "correct" tuning mentioned above. Of particular importance to AFC performance are the "zero" value error voltages contributed by the associated picture and sound carriers. In the event of the tuning error shown in FIG. 2A by intercepts 42, 45 and 46, a pair of AFC control effects shown as voltage "arrows" 56 and 57 respectively are produced by the above-described detection within multiplier 32. It should be noted that the control effects produce complementary like-polarity error signal contributions which have a combined effect on the frequency of VCO 34. This is of particular importance since (as shown in FIG. 2A) the tuning error results in a condition in which the associated sound carrier rather than the picture carrier is of greater amplitude and therefore may become dominant. In extreme conditions of mistuning, the picture carrier "falls" into the adjacent channel carrier trap and no significant energy due to the picture carrier is present causing the AFC system to respond solely to the sound carrier.

Figure 3:
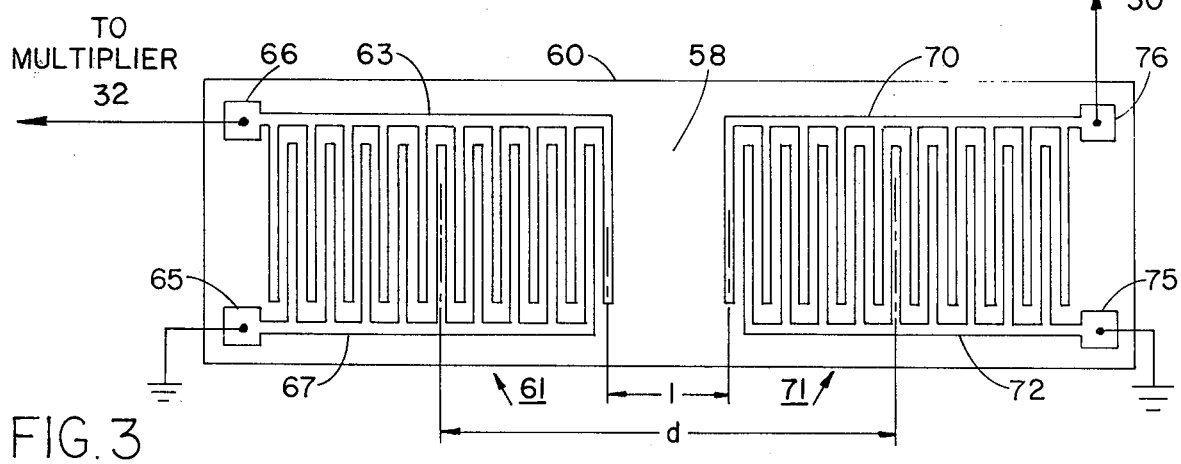
FIG. 3 is a drawing of the surface acoustic wave filter used in the present invention AFC system.

FIG. 3 shows surface acoustic wave filter 31. A piezoelectric medium 60 has a surface wave propagating surface 58 upon which a launching transducer 71 is formed by a pair of interdigitated comb-like structures 70 and 72, each of which includes a plurality of interleaved conductive fingers. Comb-like structure 70 terminates in a conductive pad 76, which is coupled to limiter 30 while comb-like structure 72 terminates in a similar conductive pad 75, which is connected to ground. A similarly constructed receiving transducer 61 is spaced apart from transducer 71 on surface 58 and includes a second pair of comb-like structures 63 and 67, each having a plurality of interleaved conductive fingers. Comb-like structure 63 terminates in a conductive pad 66, which is coupled to one input of multiplier 32 while comb-like structure 67 terminates in a conductive pad 65, which is connected to ground. It will be apparent to those skilled in the television art that a "balanced" input-output arrangement may be employed without departing from the spirit of the present invention.

In operation, a time-varying voltage produced by limiter 30 is applied to launching transducer 71 where an electric-to-acoustic energy conversion takes place. The periodic stressing of wave propagating surface 58 in the regions between the comb elements launches surface acoustic waves which propagate across surface 58 and impinge receiving transducer 61. At transducer 61 a second energy conversion occurs in which the mechanical energy present in the impinging acoustic waves is reconverted to electrical energy appearing as a voltage between electrode structures 63 and 67 and driving one input of multiplier 32.

As is known, the periodicity of surface acoustic wave filter transducer fingers causes a frequency response characteristic to be imparted to signals passing through the filter. In addition, a frequency-dependent phase relationship is also imparted to coupled signals.

The general phase response of a surface acoustic wave filter as a function of frequency is given by:

$$\Delta \phi = (d/v) f 360°$$

where $\Delta \phi$ is the change of signal phase within the filter, $d$ is the center-to-center transducer spacing $v$ is the surface acoustic wave velocity, and $f$ is the signal frequency.

The multiplication process within multiplier 32 of input signals having a relative phase $\Delta \phi$ produces an error signal having a response shown in FIG. 2C. As mentioned, it is desirable in accordance with the present invention to obtain a phase shift characteristic for filter 31 having quadrature phase shifts at the frequency of the associated channel picture carrier and a frequency approximately 2.25MHz lower (i.e., midway between associated channel sound and picture carriers). The center-to-center spacing between transducers for quadrature points (and therefore zero value error voltages) is given by the formula:

$$d = f \lambda / 2 \Delta f$$

where $\Delta f$ is the desired frequency spacing, $\lambda$ is the wavelength of the surface acoustic wave and $f$ is the signal frequency.

It has been found that the desired characteristic for surface acoustic wave filter 31 is achieved using a lithium niobate wave propagating medium and launching and receiving transducers each having nine transducer sections, a center-to-center spacing ($d$ in FIG. 3) of 10.375 $\lambda$ at 45.75MHz, and transducer separation (L in FIG. 3) of 1⅜ acoustic wavelengths at 45.75MHz.

It has also been found that the above-described construction yields an additional significant advantage by producing an amplitude response having a trap at the frequency of said associated channel sound carrier. This provides assurance that sound carrier cross products will not be produced by multiplier 32.

What has been shown is a novel AFC system in which a surface acoustic wave filter provides a frequency-dependent phase shift for a multiplier type detector. The system shown presents several advantages not attainable by prior art systems. The surface acoustic wave device lends itself to high speed manufacturing operations and requires no adjustment. In addition, the use of similar surface acoustic wave devices as other filters within the receiver makes possible the attainment of similar "tracking" characteristics during temperature changes.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a television tuning system, for receiving a broadcast signal having frequency-spaced sound and picture carriers, said tuning system having a voltage controlled oscillator producing a heterodyning signal, a frequency converter responsive to said received broadcast signal and said heterodyning signal translating said broadcast signal to an intermediate frequency signal having frequency-spaced intermediate frequency picture and sound carriers, and an intermediate frequency filter; automatic frequency control means producing a first control effect due to said intermediate frequency picture carrier and a second control effect due to said intermediate frequency sound carrier, said automatic frequency control means comprising:

a surface acoustic wave filter having a frequency-dependent phase characteristic such that a quadrature phase shift is imposed upon signals at said intermediate frequency picture carrier frequency and signals of a predetermined frequency between said intermediate frequency picture and sound carriers;

multiplier means having first and second input channels, producing an error signal having a zero value when said input signals are in quadrature and opposite polarity maxima when said input signals are in-phase and counter-phase;

first coupling means coupling said intermediate frequency filter to the input of said surface acoustic wave filter and to said first input channel of said multiplier means;

second coupling means coupling the output of said surface acoustic wave filter to said second input channel; and third coupling means coupling said multiplier means error signal to said voltage controlled oscillator.

2. Automatic frequency control means as set forth in claim 1 wherein said first coupling means include amplitude limiter means producing a substantially constant amplitude intermediate frequency signal.

3. Automatic frequency control means as set forth in claim 2 wherein said third coupling means include a low-pass filter network.

4. Automatic frequency control means as set forth in claim 3 wherein said surface acoustic wave filter has a frequency-dependent amplitude characteristic having a trap response at the frequency of said sound carrier.

5. A television tuning system having a voltage controlled oscillator and frequency converter cooperating to convert a receiver broadcast signal to an intermediate frequency signal having frequency-spaced sound and picture carriers; an intermediate frequency filter having a predetermined frequency response; and automatic frequency control means operative upon said voltage controlled oscillator to maintain correct frequency conversion, said automatic frequency control means comprising:

limiter means coupled to said intermediate frequency filter producing a constant amplitude output signal by amplitude limiting said intermediate frequency signal;

a surface acoustic wave filter coupled to said limiter means having a predetermined frequency-dependent phase shift characteristic;

phase detecting means having a first input coupled to said limiter means and a second input coupled to the output of said surface acoustic wave filter; and means coupling the output signal of said phase detecting means to said voltage controlled oscillator, said intermediate frequency filter characteristic, and predetermined frequency-dependent phase shift characteristic being selected such that said intermediate frequency filter, said limiter means, said surface acoustic wave filter and said phase detecting means cooperate to produce a phase detecting means output voltage characteristic having zero crossings at said intermediate frequency picture carrier frequency and at a frequency between the frequencies of said intermediate frequency picture and sound carriers.

6. A television tuning system as set forth in claim 5 wherein said predetermined frequency-dependent phase shift characteristic is substantially linear within the range of frequencies bounded by said intermediate frequency picture and sound carriers.

7. A television tuning system as set forth in claim 6 wherein said predetermined frequency-dependent phase shift characteristic includes quadrature phase shifts at said intermediate frequency picture carrier and at a frequency substantially midway between said intermediate frequency picture and sound carriers.

* * * * *